(No Model.)
P. BARKER.
GRAIN METER.
No. 418,780. Patented Jan. 7, 1890.
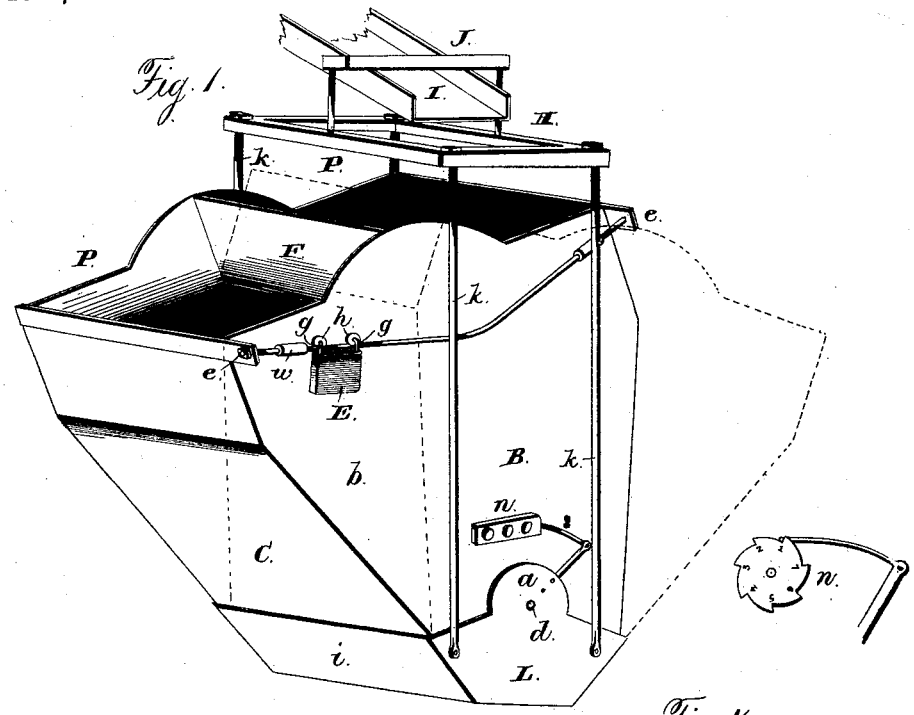
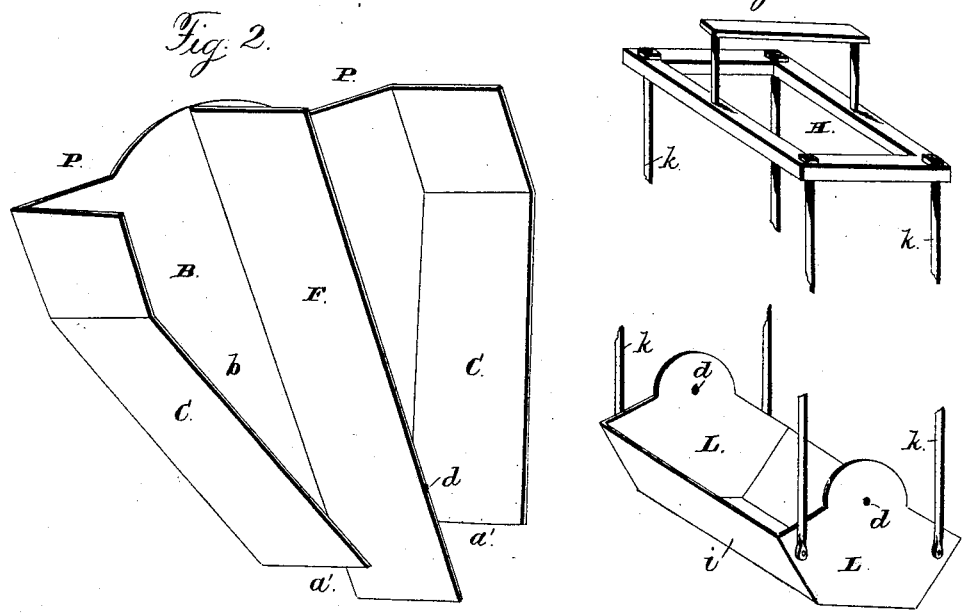
Witnesses:
Jas. E. Hutchinson
G. F. Downing
Inventor:
Peleg Barker
By H. A. Seymour, atty.

UNITED STATES PATENT OFFICE.

PELEG BARKER, OF KEARNEY, NEBRASKA.

GRAIN-METER.

SPECIFICATION forming part of Letters Patent No. 418,780, dated January 7, 1890.

Application filed April 16, 1889. Serial No. 307,518. (No model.)

*To all whom it may concern:*

Be it known that I, PELEG BARKER, a citizen of the United States, residing at Kearney, in the county of Buffalo and State of Nebraska, have invented certain new and useful Improvements in Grain-Meters; and I do hereby declare the following to be a full, clear, and exact description of the invention, such as will enable others skilled in the art to which it appertains to make and use the same.

My invention relates to an improvement in meters for measuring grain, and has for its object to provide a grain-meter which shall be simple in construction, cheap to manufacture, effective in operation, and one which may be readily attached to a thrashing or other machine.

With this object in view my invention consists in certain novel features of construction and combinations and arrangements of parts, as hereinafter set forth, and pointed out in the claims.

In the accompanying drawings, Figure 1 is a perspective view of the device supported on a chute through which the grain to be weighed passes. Fig. 2 is a perspective view of the hopper with one side removed. Fig. 3 is a detached view of the spout at the bottom of the hopper and the frame-work which supports it.

H represents a frame, preferably made in rectangular form, of any suitable material. Secured to the frame H, and depending from each corner thereof, are rods $k$, which carry at their lower ends a casing or spout L, which acts as a valve, as hereinafter explained. The side walls $i$ of this casing or spout are preferably made inclined or divergent, and the ends are provided with upward extensions $a$.

A hopper B is located between the two pairs of depending rods $k$ and pivotally supported on the casing or spout L, as presently explained. The hopper B is composed of two V-shaped sides $b$, united at opposite edges by end pieces $c$, and a partition F, extending from the top of the hopper through the center thereof, and preferably a short distance below the smaller or outlet end thereof. Pivot-pins $d$ are secured in the longitudinal edges of the partition F, which, projecting out through the sides $b$, pass through perforations in the extensions $a$ of the spout L, and thus the hopper is pivotally supported on said spout.

Projecting from the hopper at or near its top, and at opposite ends thereof, are two lateral projections $e$, to which the respective ends of a rod or scale-beam $m$ is secured, said rod being preferably curved or bent at its center, as shown in Fig. 1. The rod $m$ is provided with a weight E, adapted to move from one side to the other of the center of the rod as the device operates, and adjustable stops $w$ to limit the movement of the weight on the rod, and thus regulate the amount of grain required to operate the apparatus.

The weight E is preferably provided with upwardly-projecting arms $g$, in which rollers $h$ are journaled, thus permitting the weight to roll on the rod $m$ without liability of binding.

Secured to and projecting from one of the extensions $a$ of spout L is an arm R, and to the free end of said arm a dog S is pivotally attached. The dog S is adapted to engage the mechanism of a suitable register $n$, secured to the sides $b$ of the hopper B and operate said register as the hopper vibrates.

It will be seen that when the parts are in the position shown in Fig. 1 one of the side walls $i$ of the spout L will close one of the outlets $a'$ of the hopper. When the compartment of the hopper having its outlet closed shall have received sufficient weight of grain to overcome the weight E, the hopper will vibrate, and thus the outlet of the filled compartment will be opened and the contents of said compartment permitted to be discharged into a suitable receptacle beneath the spout L. During the operation of the hopper the filled compartment thereof will move out of line with the chute I and the empty compartment will move in line with said chute. As soon as the hopper is tilted, the weight E will roll along the rod $m$ until stopped by the stop $w$, near the opposite end thereof, and thus set the apparatus for weighing grain in the other compartment. As the rod $m$ is bent at its center, the half of the rod carrying the weight E will be horizontal, and at the instant the hopper is tilted the rod will begin to assume an inclined position, thus permitting the weight to begin to move to the other end of the rod. As the hopper continues its tilting movement, the incline of half the rod becomes greater, and when the hopper shall have moved to the end of its vibration the second half of the rod will have assumed a horizontal position. By this arrangement the movement of the weight will be quick and the operation of the device rendered sensitive and accurate.

Any suitable means may be employed for suspending the device from the chute I or other device from which grain is to be discharged. In the drawings I have shown a yoke J attached to the frame H for this purpose.

Having fully described my invention, what I claim as new, and desire to secure by Letters Patent, is—

1. In a grain-meter, the combination, with a frame and a series of rods depending therefrom, of a spout secured to the free ends of said rods, and a two-part hopper pivotally supported on said spout, so that the side walls of the spout will alternately close the outlets of the hopper as the hopper vibrates, substantially as set forth.

2. In a grain-meter, the combination, with a frame and a series of rods depending therefrom, of a spout secured to the free ends of the rods, a hopper pivotally supported on the spout, and a partition extending centrally through the hopper and beyond the outlet thereof, whereby the side walls of the spout will alternately close the openings between the end of the partition and the ends of the hopper as the hopper vibrates, substantially as set forth.

3. In a grain-meter, the combination, with a frame, of a spout supported thereby and a two-part hopper pivotally supported on said spout, a rod secured to the hopper and extending across one face thereof, and a movable weight carried by said rod, substantially as set forth.

4. In a grain-meter, the combination, with a frame, of a spout supported thereby and a two-part hopper pivotally supported on said spout, a rod secured to the hopper, bent at its center and extending across one face of the hopper, and a movable weight carried by said rod, substantially as set forth.

5. In a grain-meter, the combination, with a frame, of a spout supported thereby, a two-part hopper pivotally supported on said spout, a rod secured to the hopper, a movable weight on said rod, and adjustable stops on the rod to limit the movements of the weight, substantially as set forth.

6. In a grain-meter, the combination, with a frame, of a spout supported thereby and a two-part hopper pivotally supported on said spout, a rod secured to the hopper, a weight provided with rollers to run on said rod, and adjustable stops on the rod to limit the movement of the weight, substantially as set forth.

In testimony whereof I affix my signature in presence of two witnesses.

PELEG BARKER.

Witnesses:
J. E. GILLESPIE,
CHARLES SCHUSTER.